(12) United States Patent
Ogawa et al.

(10) Patent No.: US 8,768,595 B2
(45) Date of Patent: Jul. 1, 2014

(54) VEHICLE BRAKING FORCE CONTROL DEVICE

(75) Inventors: Takahiro Ogawa, Kanagawa (JP); Kazuhiro Yamada, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 13/391,804

(22) PCT Filed: Sep. 3, 2009

(86) PCT No.: PCT/JP2009/065392
§ 371 (c)(1),
(2), (4) Date: Feb. 22, 2012

(87) PCT Pub. No.: WO2011/027441
PCT Pub. Date: Mar. 10, 2011

(65) Prior Publication Data
US 2012/0150409 A1 Jun. 14, 2012

(51) Int. Cl.
*B60T 8/176* (2006.01)
*B60T 8/1761* (2006.01)

(52) U.S. Cl.
CPC .............. *B60T 8/176* (2013.01); *B60T 8/1761* (2013.01)
USPC ................... 701/71; 701/48; 701/70; 701/78; 701/79; 701/83; 303/9.71; 303/113.2; 303/113.3; 303/113.4; 303/116.1; 303/119.1; 303/122.03; 303/124; 303/125; 303/152; 303/155; 303/166; 303/167

(58) Field of Classification Search
CPC .......... B60T 7/042; B60T 7/085; B60T 8/00; B60T 8/32; B60T 8/3205; B60T 8/1766; B60T 11/228; B60T 2220/00; B60T 2220/04; B60T 2220/06; B60T 8/176; B60T 8/1761; B60T 2201/09; B60T 2201/16; B60T 2270/10

USPC ..................... 701/48, 70–71, 78–79, 83, 110; 303/9.71, 113.2, 113.3, 113.4, 116.1, 303/119.1, 122.03, 124–125, 152, 155, 303/166–167
See application file for complete search history.

(56) References Cited

U.S. PATENT DOCUMENTS 4,779,696 A * 10/1988 Harada et al. ................. 180/197
5,077,672 A * 12/1991 Nobumoto et al. ............. 701/92

(Continued)

FOREIGN PATENT DOCUMENTS

JP H04-43133 2/1992
JP H05-32162 2/1993

(Continued)

OTHER PUBLICATIONS

PCT/JP2009/065392 International Search Report.

*Primary Examiner* — Mary Cheung
*Assistant Examiner* — Atul Trivedi
(74) *Attorney, Agent, or Firm* — Michael Best & Friedrich LLP

(57) ABSTRACT

A vehicle braking force control device which, at a normal time, performs antilock brake control when the slip ratio of a wheel has become equal to or greater than a predetermined threshold. The control device acquires from the engine control unit an accelerator pedal position signal corresponding to an accelerator pedal position, a clutch connection signal corresponding to a state of connection of a clutch, and a power transmission signal corresponding to a state of power transmission of a transmission. When engine braking is large on the basis of the accelerator pedal position signal, the clutch connection signal, and the power transmission signal, the vehicle braking force control device changes the predetermined threshold value to an offset threshold value that makes it harder to perform the antilock brake control than at the normal time.

12 Claims, 7 Drawing Sheets

(56) References Cited

U.S. PATENT DOCUMENTS

| | | | |
|---|---|---|---|
| 5,159,991 A * | 11/1992 | Tsuyama et al. | 180/197 |
| 5,265,694 A * | 11/1993 | Yamashita | 180/197 |
| 5,332,056 A * | 7/1994 | Niibe et al. | 180/169 |
| 5,549,371 A * | 8/1996 | Konaga et al. | 303/152 |
| 5,654,887 A * | 8/1997 | Asa et al. | 701/22 |
| 5,816,979 A * | 10/1998 | Shiiba et al. | 477/176 |
| 6,338,017 B1 * | 1/2002 | Kato et al. | 701/79 |
| 7,066,559 B2 * | 6/2006 | Imamura | 303/140 |
| 7,125,085 B2 * | 10/2006 | Ohsaki et al. | 303/119.1 |
| 8,277,365 B2 * | 10/2012 | Ohbayashi et al. | 477/183 |
| 2001/0038242 A1 * | 11/2001 | Soejima et al. | 303/113.1 |
| 2001/0043010 A1 * | 11/2001 | Soejima et al. | 303/146 |
| 2002/0180262 A1 * | 12/2002 | Hara et al. | 303/119.1 |
| 2003/0184152 A1 * | 10/2003 | Cikanek et al. | 303/152 |
| 2004/0064239 A1 * | 4/2004 | Nagura et al. | 701/89 |
| 2005/0080536 A1 * | 4/2005 | Yamaguchi et al. | 701/51 |
| 2006/0055234 A1 * | 3/2006 | Choi et al. | 303/113.1 |
| 2006/0074530 A1 * | 4/2006 | Meyers et al. | 701/1 |
| 2006/0108868 A1 * | 5/2006 | Ohsaki et al. | 303/154 |
| 2006/0131956 A1 * | 6/2006 | Matsuura et al. | 303/152 |
| 2006/0183600 A1 * | 8/2006 | Kamikado | 477/182 |
| 2006/0220453 A1 * | 10/2006 | Saito et al. | 303/152 |
| 2007/0228822 A1 * | 10/2007 | Hirata | 303/151 |
| 2008/0036291 A1 * | 2/2008 | Sakai | 303/11 |
| 2008/0105479 A1 * | 5/2008 | Nishiike et al. | 180/197 |
| 2008/0125267 A1 * | 5/2008 | Dourra et al. | 475/123 |
| 2009/0132137 A1 * | 5/2009 | Takenaka et al. | 701/70 |
| 2010/0063693 A1 * | 3/2010 | Lee et al. | 701/54 |
| 2010/0063694 A1 * | 3/2010 | Lee et al. | 701/54 |
| 2010/0145585 A1 * | 6/2010 | Gesnot et al. | 701/68 |
| 2010/0197449 A1 * | 8/2010 | Imamura et al. | 477/3 |
| 2010/0198474 A1 * | 8/2010 | Shiiba et al. | 701/70 |
| 2010/0222973 A1 * | 9/2010 | Senda et al. | 701/54 |
| 2011/0148184 A1 * | 6/2011 | Suzuki et al. | 303/3 |
| 2011/0148185 A1 * | 6/2011 | Okano et al. | 303/6.01 |
| 2011/0221265 A1 * | 9/2011 | Busack et al. | 303/152 |

FOREIGN PATENT DOCUMENTS

| | | |
|---|---|---|
| JP | H05-215209 | 8/1993 |
| JP | H07-27221 | 1/1995 |
| JP | H09-267733 | 10/1997 |
| JP | 2004231035 | 8/2004 |
| KR | 1999022995 | 3/1999 |
| KR | 20040053757 | 6/2004 |

* cited by examiner

VEHICLE BRAKING FORCE CONTROL DEVICE

BACKGROUND OF THE INVENTION

The present invention relates to a vehicle braking force control device that performs antilock brake control of a brake device.

Conventionally, vehicle braking force control devices that control the hydraulic pressure of brake fluid supplied to a brake device to perform antilock brake control of the brake device have been known. This type of vehicle braking force control device has performed antilock brake control at a time when it has detected wheel slip.

In a vehicle in which a vehicle braking force control device is installed, a braking force resulting from engine braking acts in addition to the braking force resulting from the brake device. In cases where the braking force resulting from engine braking acts, like at times when the brake device has been actuated, the load of the vehicle body moves to the front wheel side, whereby the load on the rear wheel ends up decreasing and the rear wheel ends up in a state where it easily slips. For this reason, for example, in rear-wheel drive automobiles and motorcycles, in a case where the rear wheel has slipped due to engine braking during cornering, the vehicle braking force control device has resumed the supply of fuel to the engine to decrease the braking force resulting from engine braking. This leaves the driver unable to obtain the feeling of deceleration that the driver expects, so a vehicle braking force control device that controls the braking force of the front wheel in accordance with the slip state of the rear wheel has been proposed (e.g., JP-A-9-267733).

However, in the above-described conventional vehicle braking force control device, at a time when engine braking resulting from a downshift or the like acts and the drive wheel has entered a slip state, for example, antilock brake control intervenes even without the brake device being caused to perform braking. Even if the driver causes the brake device to perform braking in this state, braking by the brake device has become slow or it has been difficult for the brake device to perform braking due to the intervention of antilock brake control. For this reason, when a large braking force resulting from engine braking is generated, it has been difficult to cause the brake device to perform braking as envisioned by the driver.

SUMMARY OF THE INVENTION

It is an object of the present invention to provide a vehicle braking force control device that can solve the problem in the conventional art described above and cause a brake device to perform braking as envisioned by the driver even in a situation where a large braking force resulting from engine braking is acting.

The present invention provides a vehicle braking force control device that is installed in a vehicle and which, at a normal time, performs antilock brake control at a time when the slip ratio of a wheel has become equal to or greater than a predetermined threshold, wherein the vehicle braking force control device acquires an accelerator pedal position signal corresponding to an accelerator pedal position, a clutch connection signal corresponding to a state of connection of a clutch, and a power transmission signal corresponding to a state of power transmission of a transmission, and at a time when the vehicle braking force control device has determined that the action of engine braking is large on the basis of the accelerator pedal position signal, the clutch connection signal, and the power transmission signal, the vehicle braking force control device changes the predetermined threshold value to an offset threshold value that makes it harder to perform the antilock brake control than at the normal time.

In this case, the change to the threshold value may be maintained for a predetermined amount of time. The vehicle braking force control device may determine that the action of engine braking is large at a time when the accelerator pedal position decreases equal to or greater than a predetermined pedal position within a predetermined amount of time, the clutch is in a connected state, and the transmission is in a power transmitting state. The vehicle braking force control device may determine that the accelerator pedal position has decreased equal to or greater than a predetermined pedal position within a predetermined amount of time in a case where the accelerator pedal position has reached a substantially completely closed state from a state equal to or greater than a predetermined value.

In this case, the vehicle braking force control device may further acquire an engine speed signal corresponding to an engine speed, and the vehicle braking force control device may determine that the action of engine braking is large at a time when the transmission is downshifted, the accelerator pedal position is in a substantially completely closed state, the clutch is in a connected state, the transmission is in a power transmitting state, and the engine speed is equal to or greater than a predetermined speed and rising. The change to the threshold value may be maintained while the engine speed is equal to or greater than a predetermined speed and rising. The offset threshold value at the time accompanied by the downshift may make it harder to perform the antilock brake control than the offset threshold value at the time unaccompanied by the downshift. The amount of time in which the vehicle braking force control device maintains the predetermined threshold value at the offset threshold value may be longer in the case of the offset threshold value at the time accompanied by the downshift than in the case of the offset threshold value at the time unaccompanied by the downshift.

In this case, when the vehicle braking force control device returns the offset threshold value to the original predetermined threshold value, the vehicle braking force control device may gently decrease the offset amount of the offset threshold value. When engine braking at the time when the transmission has been downshifted and engine braking at the time when the accelerator pedal position has decreased equal to or greater than a predetermined pedal position within a predetermined amount of time have been determined at substantially the same time, the vehicle braking force control device may change the predetermined threshold value to the offset threshold value at the time when the transmission has been downshifted.

In this case, the vehicle braking force control device may be connected to an engine control unit that controls an engine, and the vehicle braking force control device may acquire the accelerator pedal position signal, the clutch connection signal, and the power transmission signal from the engine control unit.

In the present invention, a brake device can be caused to perform braking as envisioned by a driver even in a situation where a large braking force resulting from engine braking is acting.

DETAILED DESCRIPTION

An embodiment of the present invention will be described below with reference to the drawings.

Figure 1:
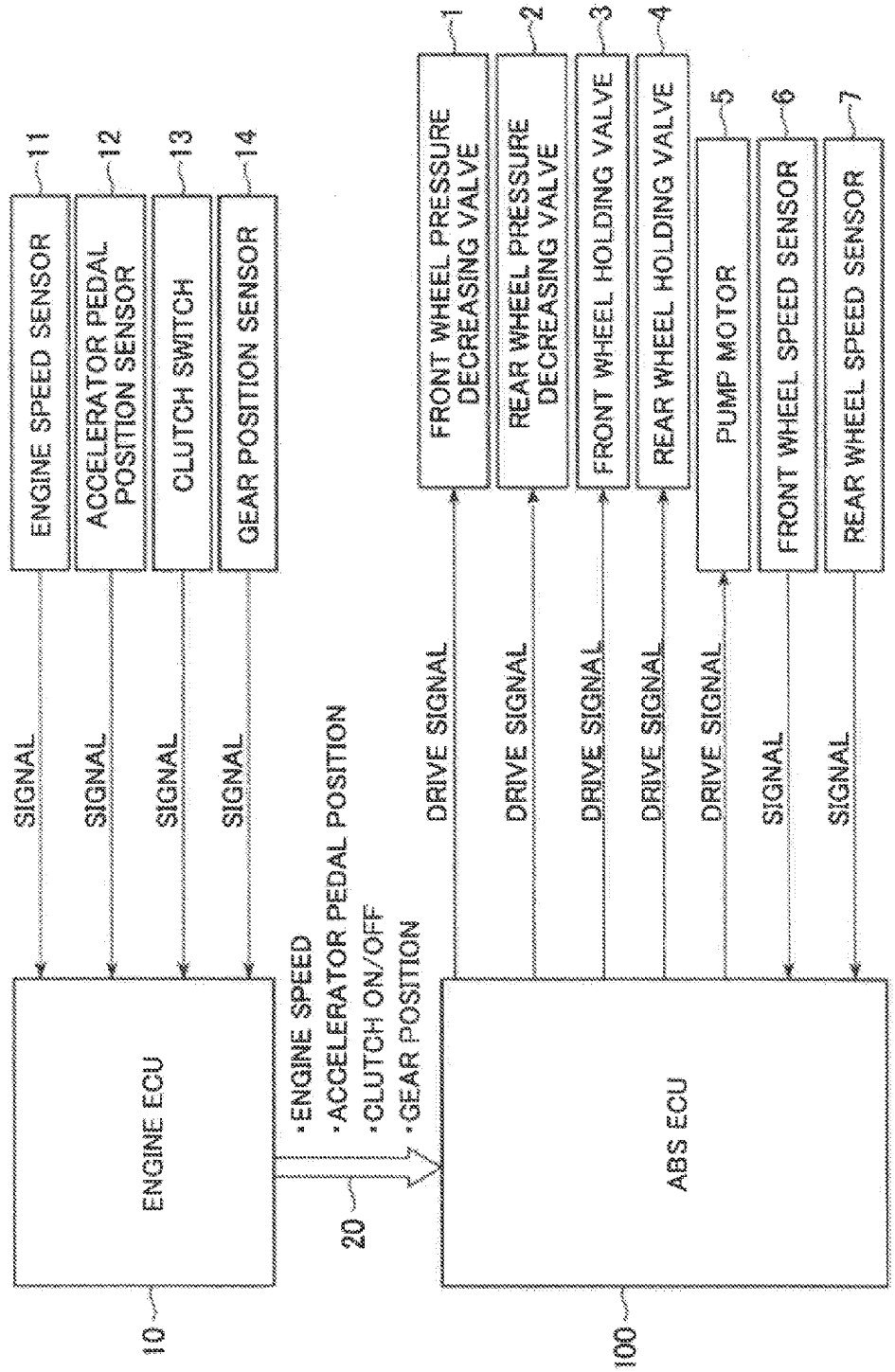
FIG. 1 is a block diagram showing an ABS-ECU pertaining to an embodiment of the present invention, an engine ECU connected thereto, and so forth.

FIG. 1 is a block diagram showing an ABS-ECU, an engine ECU connected thereto, and so forth.

The ABS-ECU 100 serving as a vehicle braking force control device is a control device that is mainly installed in a motorcycle vehicle and which, during braking, is for performing antilock brake control of a brake device in order to restore wheel grip at a time when the slip ratio of a wheel has become equal to or greater than a predetermined threshold value. The ABS-ECU 100 is electrically connected, by a connecting line 20, to an engine ECU 10 serving as an engine control unit that controls an engine. The ABS-ECU 100 is electrically connected to a front wheel pressure decreasing valve 1, a rear wheel pressure decreasing valve 2, a front wheel holding valve 3, a rear wheel holding valve 4, a pump motor 5, a front wheel speed sensor 6, and a rear wheel speed sensor 7.

The front wheel pressure decreasing valve 1, the rear wheel pressure decreasing valve 2, the front wheel holding valve 3, and the rear wheel holding valve 4 are control valves. The ABS-ECU 100 performs antilock brake control of a front wheel by outputting drive signals to and controlling the front wheel pressure decreasing valve 1 and the front wheel holding valve 3. The ABS-ECU 100 also performs antilock brake control of a rear wheel by outputting drive signals to and controlling the rear wheel pressure decreasing valve 2 and the rear wheel holding valve 4.

The pump motor 5 is a motor for driving an unillustrated hydraulic pump. The ABS-ECU 100 returns brake fluid to a master cylinder to which the front wheel pressure decreasing valve 1, the rear wheel pressure decreasing valve 2, the front wheel holding valve 3, and the rear wheel holding valve 4 are attached by outputting a drive signal to the pump motor 5 to control the hydraulic pump.

The front wheel speed sensor 6 and the rear wheel speed sensor 7 detect the wheel speeds of the front wheel and the rear wheel of the vehicle and output the wheel speeds to the ABS-ECU 100 as wheel speed signals. The ABS-ECU 100 calculates the vehicle body speed and the slip ratio of the front wheel or the rear wheel ((vehicle body speed−wheel speed)÷vehicle body speed) on the basis of the acquired wheel speed signals. The ABS-ECU 100 calculates the vehicle body speed on the basis of the front wheel speed or the rear wheel speed and considers this vehicle body speed as the speed at which the vehicle body travels.

The engine ECU 10 is electrically connected to an engine speed sensor 11, an accelerator pedal position sensor 12, a clutch switch 13, and a gear position sensor 14.

The engine speed sensor 11 detects the engine speed of an unillustrated engine installed in the vehicle and outputs an engine speed signal corresponding to the engine speed to the engine ECU 10.

The accelerator pedal position sensor 12 is a throttle position sensor or the like, but the accelerator pedal position sensor 12 may also determine the accelerator pedal position on the basis of a flow volume measured by a flowmeter such as an air flow sensor. The accelerator pedal position sensor 12 detects the opening of a throttle valve—that is, the accelerator pedal position—and outputs an accelerator pedal position signal corresponding to the accelerator pedal position to the engine ECU 10.

The clutch switch 13 is a clutch sensor for detecting the physical state of connection of a clutch placed between the engine and a transmission and outputs a clutch ON/OFF signal (clutch connection signal) corresponding to the state of connection of the clutch to the engine ECU 10.

The gear position sensor 14 is a sensor for detecting the state of power transmission of the transmission—that is, the gear position—and outputs a gear position signal (power transmission signal) corresponding to the state of power transmission of the transmission to the engine ECU 10.

The ABS-ECU 100 can acquire the engine speed signal, the accelerator pedal position signal, the clutch ON/OFF signal, and the gear position signal from the engine ECU 10 via the connecting line 20.

Figure 2:
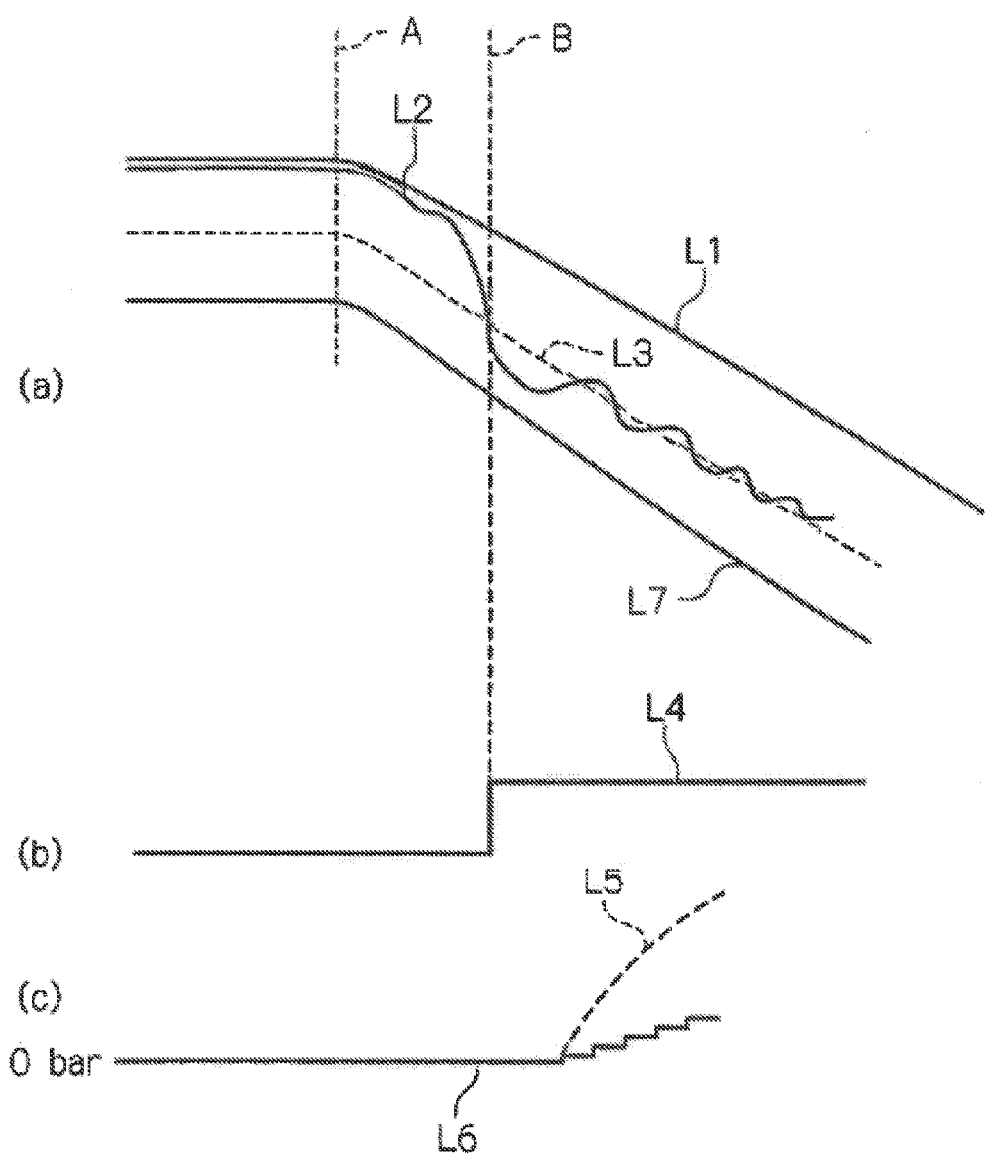
FIG. 2 is a graph showing an overview of processing for changing a threshold value that is performed by the ABS-ECU 100 at a time when engine braking with a large braking force has been detected.

FIG. 2 is a graph showing an overview of processing for changing a threshold value that is performed by the ABS-ECU 100 at a time when engine braking with a large braking force has been detected. Here, FIG. 2(a) shows a correspondence relationship between wheel speed and time, FIG. 2(b) shows a correspondence relationship between a signal for detecting the execution of antilock brake control and time, and FIG. 2(c) shows a correspondence relationship between the brake pressure of the brake device and time. The passage of time is consistent on the horizontal axes of FIG. 2(a) to FIG. 2(c).

In FIG. 2(a), as for line L1, the vertical axis represents the wheel speed of the front wheel and the horizontal axis represents time. In this figure, from a state of travel at a constant speed the acceleration pedal position is closed suddenly and engine braking acts at time A.

As for line L2, the vertical axis represents the wheel speed of the rear wheel and the horizontal axis represents time. In line L2, engine braking acts on the rear wheel that is the drive wheel, so from time A on, the wheel speed of the rear wheel becomes slower than the wheel speed of the front wheel. That is, the front wheel maintains a gripped state as indicated by line L1, but the rear wheel enters a slip state as indicated by line L2, and a difference arises between the speeds of the front wheel and the rear wheel.

Line L3 is a threshold value including a slip ratio for determining whether or not to perform antilock brake control at a normal time. At the normal time, the ABS-ECU 100 performs antilock brake control when the rear wheel reaches the slip ratio indicated by line L3. Line L3 is set in such a way as to be at a substantially regular interval with the vehicle body speed.

Line L4 in FIG. 2(b) represents whether or not the ABS-ECU 100 is executing antilock brake control, and the portion that is one lever higher indicates that the ABS-ECU 100 is executing antilock brake control. It will be understood that, as shown in FIG. 2(a), line L2 and line L3 intersect at time B, that is, the wheel speed of the rear wheel reaches the threshold value resulting from line L3 and, as shown in FIG. 2(b), the ABS-ECU 100 executes antilock brake control beginning at time B.

Line L5 in FIG. 2(c) represents the brake input imagined by the driver, that is, the operation of the brake lever by the driver. Further, line L6 represents the actual brake input, that is, variation in the brake pressure of the brake device. It will be understood that, because the rear wheel slips and antilock brake control is executed beginning at time B, the brake input envisioned by the driver and the actual brake input differ as indicated by line L5 and line L6. Because of this, when a large braking force resulting from engine braking is acting, it has been difficult to cause the brake device to perform braking as envisioned by the driver.

Line L7 in FIG. 2(a) represents a state where the ABS-ECU 100 has changed the threshold value including the slip ratio for determining whether or not to perform antilock brake control to an offset threshold value. When the ABS-ECU 100 determines that the action of engine braking is large on the basis of the engine speed signal, the accelerator pedal position signal, the clutch ON/OFF signal, and the gear position signal, the ABS-ECU 100 temporarily changes the threshold value to an offset threshold value in which the threshold value is offset as indicated in line L7. Because of this, the slip ratio at the time when the ABS-ECU 100 determines to perform antilock brake control becomes larger. It will be understood that, as shown in FIG. 2(a), line L2 does not intersect line L7, that is, does not reach the threshold value including the slip ratio for determining whether or not to perform antilock brake control. For this reason, by changing the threshold value for performing antilock brake control to the offset threshold value, the ABS-ECU 100 makes it harder to perform antilock brake control than in the case of line L3 that is the threshold value at the normal time.

Figure 3:
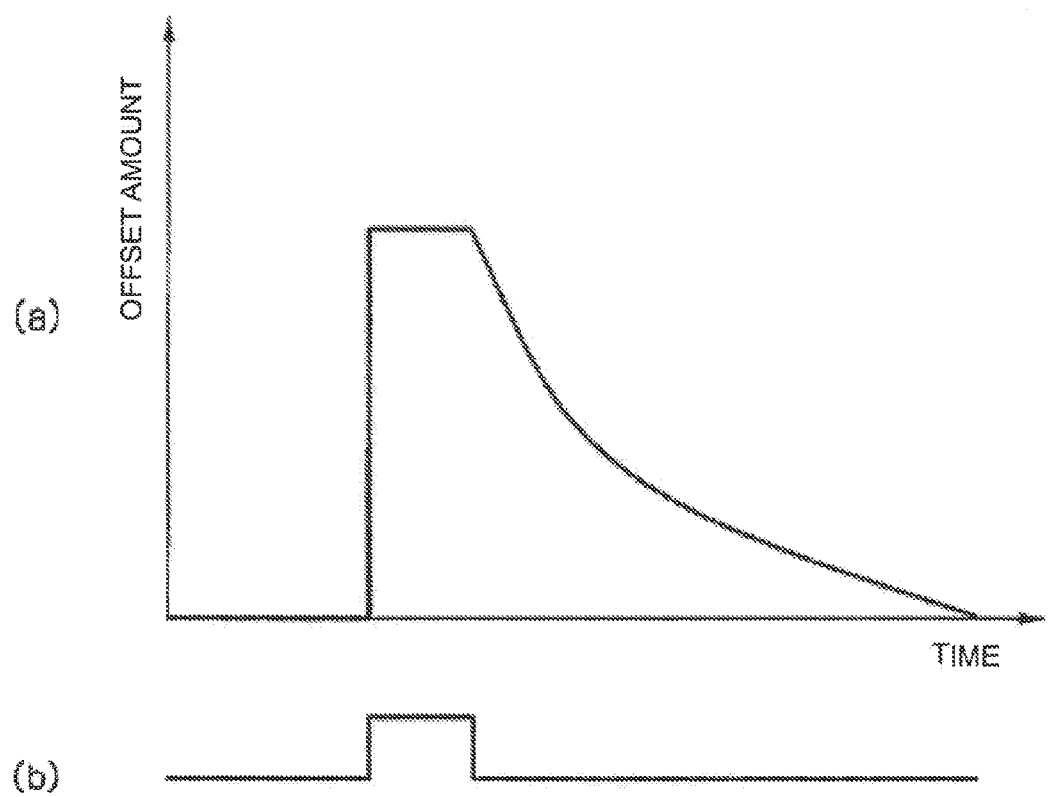
FIG. 3 is a graph showing an offset amount of the offset threshold value at a time when a sudden throttle OFF operation has been detected.
Figure 4:
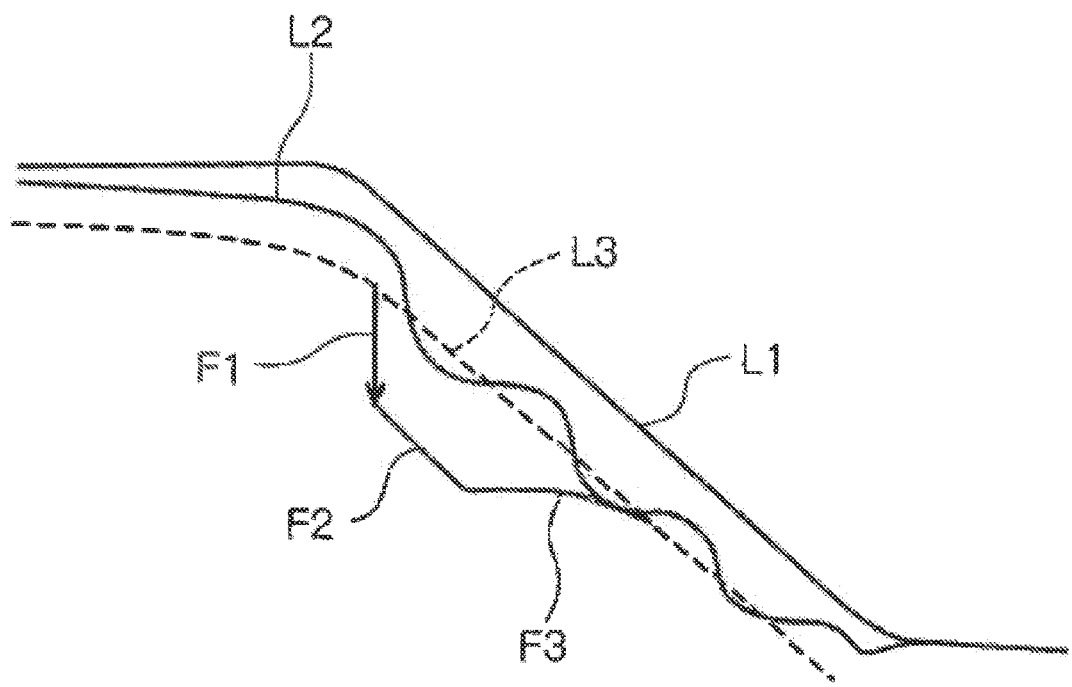
FIG. 4 is a graph showing variation of the threshold value at a time when the threshold value has been changed to the offset threshold value.

FIG. 3 is graph showing an offset amount of the offset threshold value at a time when a sudden throttle OFF operation has been detected, and FIG. 4 is a graph showing variation of the threshold value at a time when the threshold value has been changed to the offset threshold value. Here, FIG. 3(a) shows a correspondence relationship between the offset amount and elapsed time, and FIG. 3(b) shows a correspondence relationship between a signal for detecting a throttle OFF operation and time. The passage of time is consistent on the horizontal axes of FIG. 3(a) and FIG. 3(b).

With respect to the threshold value at the time when the sudden throttle OFF operation has been detected, as shown in FIG. 3(a), the ABS-ECU 100 holds the offset amount thereof at a substantially constant while the ABS-ECU 100 is detecting the throttle OFF operation, and when detection of the throttle OFF operation ends, the ABS-ECU 100 offsets the threshold value in such a way as to gently decrease the offset amount.

In the present embodiment, the ABS-ECU 100 maintains the change to the offset threshold value only while the ABS-ECU 100 is detecting the throttle OFF operation, but the ABS-ECU 100 may also maintain the change to the offset threshold value even after the ABS-ECU 100 no longer detects the throttle OFF operation, for example.

When the ABS-ECU 100 maintains the change to the offset threshold value even after the ABS-ECU 100 no longer detects the throttle off, the ABS-ECU 100 can vary the offset amount of the offset threshold value and the amount of time in which the ABS-ECU 100 offsets the threshold value, for example, to thereby set more appropriate threshold values. In this case, it is preferred that the offset threshold values corresponding to each of the gear positions be set in such a way that the lower the gear position is—that is, the more the gear position has a higher reduction ratio—the larger the offset amount becomes and the longer the amount of time in which the ABS-ECU 100 offsets the threshold value becomes, and the higher the gear position is—that is, the more the gear position has a lower reduction ratio—the smaller the offset amount becomes and the shorter the amount of time in which the ABS-ECU 100 offsets the threshold value becomes.

As shown in FIG. 4, according to the offset threshold value, the ABS-ECU 100 changes the threshold value to the offset threshold value as in line F1 when the ABS-ECU 100 has detected the throttle OFF operation, keeps the offset amount at a constant as in line F2 while the ABS-ECU 100 is detecting the throttle OFF operation, gently decreases the offset amount along the threshold value at the normal time before offset as in line F3 when detection of the throttle OFF operation ends, and returns the threshold value to the original threshold value at the normal time.

In the way described above, the threshold value for determining whether or not to perform antilock brake control is temporarily changed to the offset threshold value.

Figure 5:
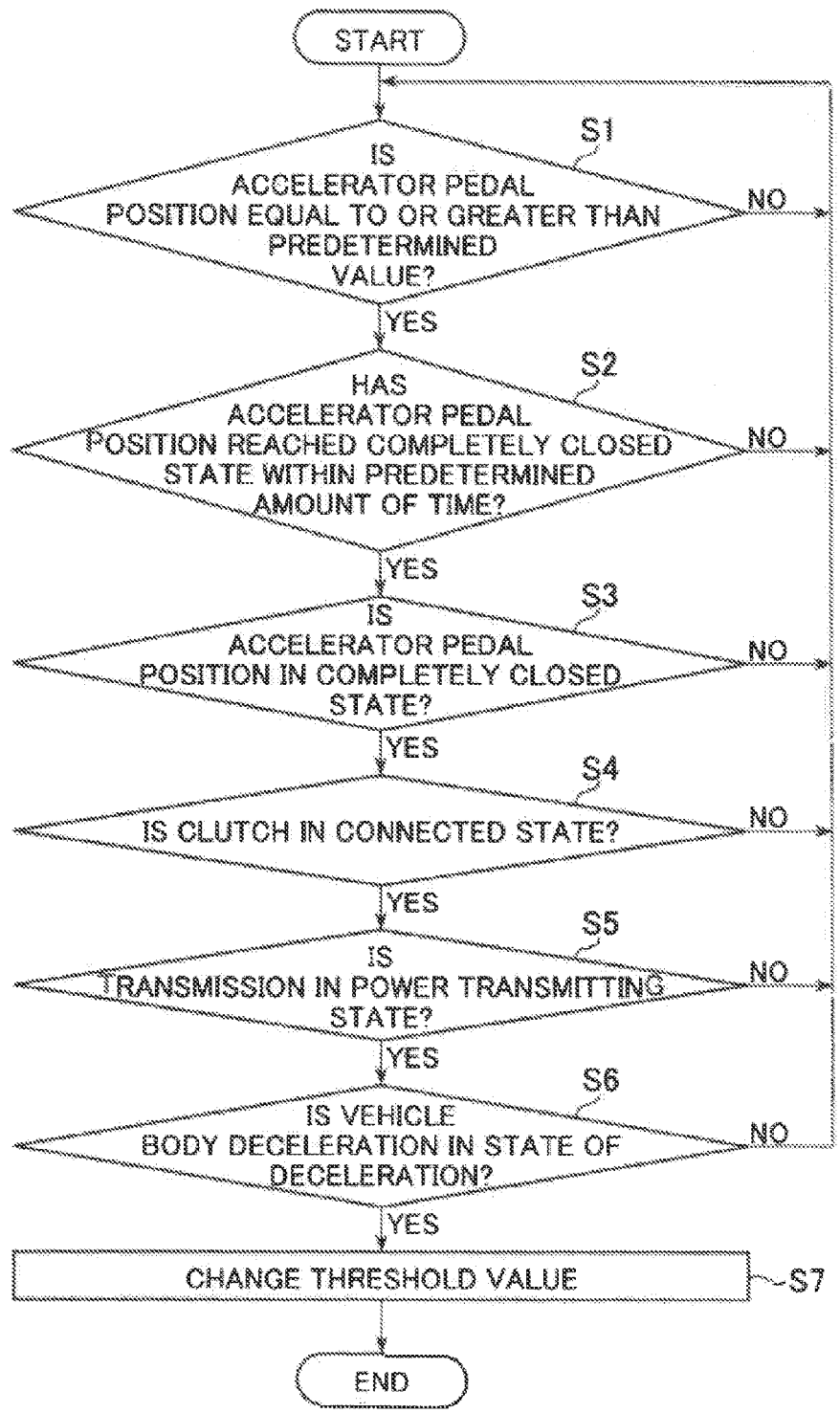
FIG. 5 is a flowchart showing actions at a time when the ABS-ECU 100 detects a sudden throttle OFF operation by a driver and changes the threshold value.

FIG. 5 is a flowchart showing actions at a time when the ABS-ECU 100 detects a sudden throttle OFF operation by the driver and changes the threshold value.

First, the ABS-ECU 100 determines whether or not the accelerator pedal position is equal to or greater than a predetermined value (step S1). Here, the predetermined value of the accelerator pedal position used in the determination is an accelerator pedal position of a sufficient size for engine braking with a large braking force to act at the time when the driver has closed the accelerator pedal position, that is, performed the throttle OFF operation, and the predetermined value is arbitrarily set.

When the ABS-ECU 100 determines in step S1 that the accelerator pedal position is equal to or greater than the predetermined value (step S1: YES), the ABS-ECU 100 determines whether or not the accelerator pedal position has reached a completely closed stated within a predetermined amount of time (step S2). Here, the predetermined amount of time at the time when the accelerator pedal position reaches a completely closed state means that the amount of time required to switch from the accelerator pedal position in step S1 to a completely closed state is an amount of time of a sufficient size for engine braking with a large braking force to act. In the present embodiment, the ABS-ECU 100 determines through step S1 and step S2 that the accelerator pedal position has decreased equal to or greater than a predetermined pedal position within the predetermined amount of time. When the ABS-ECU 100 determines in step S1 that the accelerator pedal position is not equal to or greater than the predetermined value (step S1: NO), the ABS-ECU 100 repeats the processing of step S1.

When the ABS-ECU 100 determines in step S2 that the accelerator pedal position has reached a completely closed state within the predetermined amount of time (step S2: YES), the ABS-ECU 100 determines whether or not the accelerator pedal position is in a completely closed state (step S3). Here, the completed closed state in step S2 and the completely closed state in step S3 have different threshold values for determining that the accelerator pedal position is in a completely closed state, and the completely closed state in step S3 is a more closed state—that is, a state where the volume of air taken into the engine is smaller. Both completely closed states are not limited to states where the throttle is completely closed and also include states where the throttle is slightly open. When the ABS-ECU 100 determines in step S2 that the accelerator pedal position has not reached the completely closed state within the predetermined amount of time (step S2: NO), the ABS-ECU 100 repeats the series of processing steps from step S1.

When the ABS-ECU 100 determines in step S3 that the accelerator pedal position is in a completely closed state (step S3: YES), the ABS-ECU 100 determines whether or not the clutch is in a connected state (step S4). When the ABS-ECU 100 determines in step S3 that the accelerator pedal position is not in the completely closed state (step S3: NO), the ABS-ECU 100 repeats the series of processing steps from step S1.

When the ABS-ECU 100 determines in step S4 that the clutch is in a connected state (step S4: YES), the ABS-ECU 100 determines whether or not the transmission is in a power transmitting state (step S5). Here, when the transmission is in a power transmitting state, this means a state where the transmission is not shifted to neutral. When the ABS-ECU 100 determines in step S4 that the clutch is not in a connected state (step S4: NO), the ABS-ECU 100 repeats the series of processing steps from S1.

When the ABS-ECU 100 determines that in step S5 that the transmission is in a power transmitting state (step S5: YES), the ABS-ECU 100 determines whether or not the vehicle body deceleration is in a state of deceleration (step S6). Here, when the vehicle body deceleration is in a state of deceleration, this means that it is not a state where the vehicle body is accelerating. When the ABS-ECU 100 determines in step S5 that the transmission is not in a power transmitting state (step S5: NO), the ABS-ECU 100 repeats the series of processing steps from S1.

When the ABS-ECU 100 determines in step S6 that the vehicle body deceleration is in a state of deceleration (step S6: YES), the ABS-ECU 100 changes the threshold value for determining whether or not to perform antilock brake control to the offset threshold value at the time of a sudden accelerator pedal OFF operation (step S7). When the ABS-ECU 100 determines in step S6 that the vehicle body deceleration is not in a state of deceleration (step S6: NO), the ABS-ECU 100 repeats the series of processing steps from step S1.

Because of the above-described processing, the ABS-ECU 100 can determine through step S1 to step S6 that the action of engine braking after the accelerator pedal OFF operation is large and change the threshold value for determining whether or not to perform antilock brake control to the offset threshold value at the time of a sudden accelerator pedal OFF operation.

Figure 6:
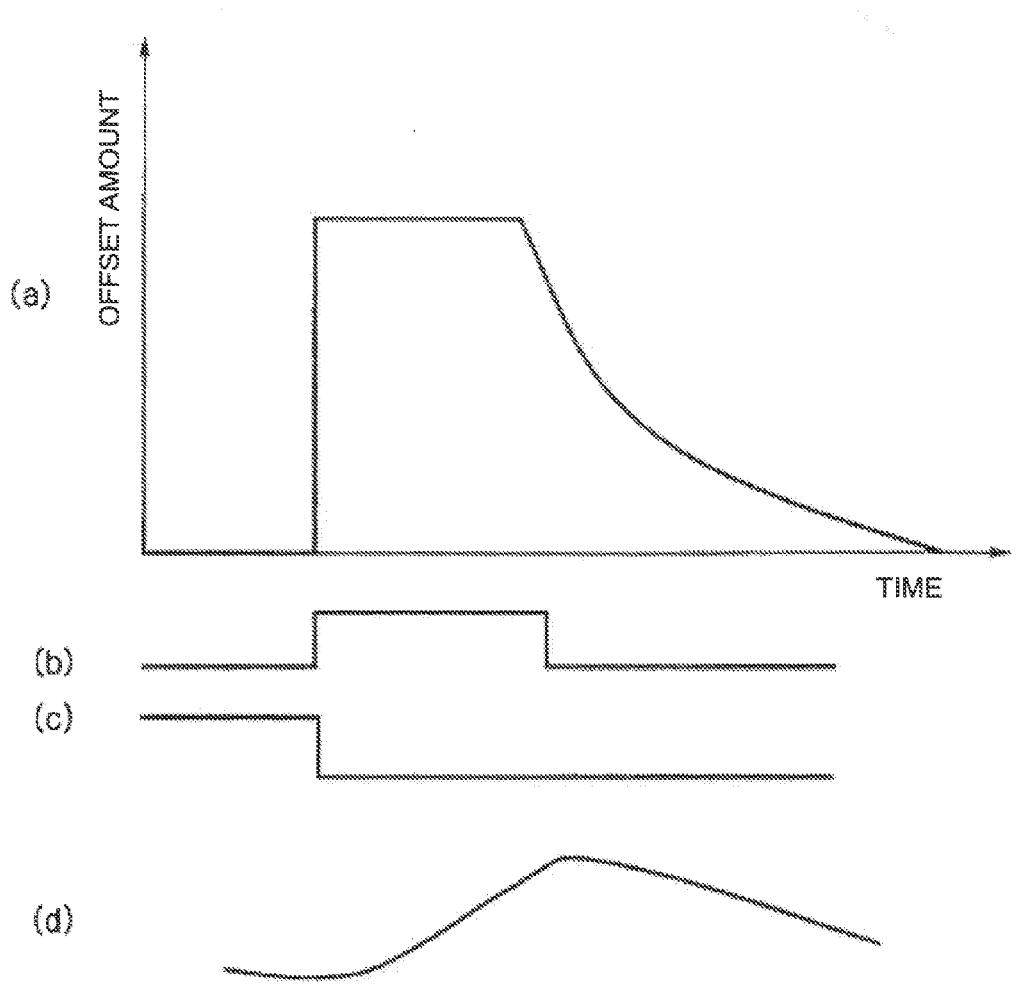
FIG. 6 is a graph showing the offset amount of the offset threshold value at a time when a downshift has been detected.

FIG. 6 is a graph showing the offset amount of the offset threshold value at a time when a downshift has been detected. FIG. 6(*a*) shows a correspondence relationship between the offset amount and elapsed time, FIG. 6(*b*) shows a relationship between a signal for detecting a downshift and time, FIG. 6(*c*) shows a relationship between a signal for detecting the gear position of the transmission and time, and FIG. 6(*d*) shows a correspondence relationship between a signal for detecting fluctuation in the engine speed and time. The passage of time is consistent on the horizontal axes of FIG. 6(*a*) to FIG. 6(*d*).

The ABS-ECU 100 in the present embodiment changes the threshold value for determining whether or not to perform antilock brake control to the offset threshold value at the same time as when it detects a downshift and a change in the gear position.

As for the offset threshold value at a time when a downshift has been detected in the present embodiment, as shown in FIG. 6(*a*), the ABS-ECU 100 holds the offset threshold value at a substantial constant in a state where the offset amount is large while the engine speed is rising and thereafter offsets the threshold value in such a way as to gently decrease the offset amount. Normally, the action of engine braking is larger at the time of a downshift than at the time of a sudden accelerator pedal OFF operation unaccompanied by a downshift, so the offset amount is larger and the amount of time in which the ABS-ECU 100 offsets the threshold value is longer in the case of the offset threshold value at the time of a downshift than in the case of the offset threshold value at the time of a sudden accelerator pedal OFF operation.

In the present embodiment, in order to facilitate understanding, the offset threshold value at the time of a downshift is made common regardless of the gear positions of the transmission before and after the downshift. However, the ABS-ECU 100 can vary, in accordance with the gear positions before and after the downshift, the offset amount of the offset threshold value and the amount of time in which the ABS-ECU 100 offsets the threshold value, for example, to thereby set more appropriate threshold values.

In this case, at a time when, for example, the braking force of engine braking is strong such as a downshift from sixth gear to first gear, that is, at the time of a downshift from the gear position whose reduction ratio is the lowest to the gear position whose reduction ratio is the highest, the offset amount is the largest and the amount of time in which the ABS-ECU 100 offsets the threshold value is also the longest.

At a time when, for example, the braking force of engine braking is weak such as a downshift from sixth gear to fifth gear, that is, at the time of a downshift from the gear position whose reduction ratio is the lowest to the gear position whose reduction ratio is the next lowest, the offset amount is the smallest and the amount of time in which the ABS-ECU 100 offsets the threshold value is also short.

The offset threshold value is set in accordance with the strength of the braking force resulting from engine braking, so, for example, the offset amount is larger and the amount of time in which the ABS-ECU 100 offsets the threshold value is longer in the case of a downshift from second gear to first gear than in the case of a downshift from fourth gear to second gear.

In a sequential manual transmission such as in motorcycles, when downshifting from sixth gear to first gear, for example, the reduction ratio is changed one gear at a time in the order of sixth gear, fifth gear, fourth gear, third gear, second gear, and first gear. For this reason, the ABS-ECU 100 may also judge that the downshift is a downshift from sixth gear to first gear in a case where the gear position has been sequentially downshifted from sixth gear to first gear within a predetermined amount of time.

Figure 7:
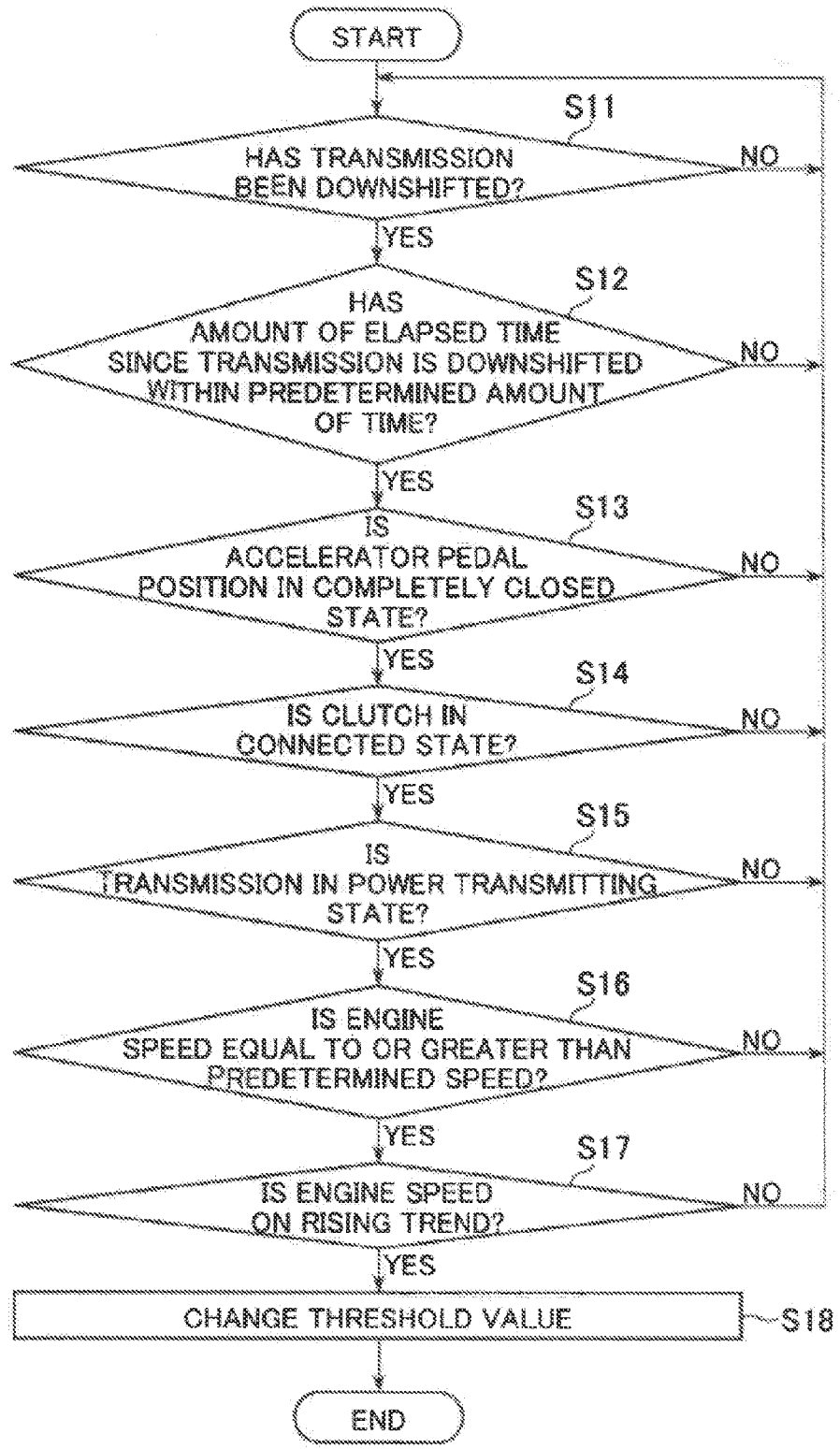
FIG. 7 is a flowchart showing actions at a time when the ABS-ECU 100 detects a downshift operation by a driver and changes the threshold value.

FIG. 7 is a flowchart showing actions at a time when the ABS-ECU 100 detects a downshift operation by the driver and changes the threshold value.

First, the ABS-ECU 100 determines whether or not the gear position of the transmission has been lowered, that is, downshifted (step S11).

When the ABS-ECU 100 determines in step S11 that the gear position has been downshifted (step S11: YES), the ABS-ECU 100 determines whether or not the amount of elapsed time after the gear position is downshifted is within a predetermined amount of time (step S12). Here, when the amount of elapsed time after the gear position is downshifted is within the predetermined amount of time, this means that the amount of elapsed time is within an amount of time in which engine braking that acts due to the effect of the downshift, for example, is predicted to be of a sufficient size for causing a wheel slip state. When the ABS-ECU 100 determines in step S11 that the gear position has not been downshifted (step S11: NO), the ABS-ECU 100 repeats the processing of step S11.

When the ABS-ECU 100 determines in step S12 that the amount of elapsed time after the gear position is downshifted is within the predetermined amount of time (step S12: YES), the ABS-ECU 100 determines whether or not the accelerator pedal position is in a completely closed state (step S13). Here, for example, in a case where the driver has downshifted in order to increase the torque of the drive wheel on an uphill slope, normally the driver increases the accelerator pedal position immediately after downshifting, so by executing the processing of step S13, a downshift on an uphill slope or the like can be distinguished from a downshift when approaching a corner or the like. When the ABS-ECU 100 determines in step S12 that the amount of elapsed time after the gear position is downshifted is not within the predetermined amount of time (step S12: NO), the ABS-ECU 100 repeats the series of processing steps from step S11.

When the ABS-ECU 100 determines in step S13 that the accelerator pedal position is in a completely closed state (step S13: YES), the ABS-ECU 100 determines whether or not the clutch is in a connected state (step S14). When the ABS-ECU 100 determines in step S13 that the accelerator pedal position is not in a completely closed state (step S13: NO), the ABS-ECU 100 repeats the series of processing steps from step S11.

When the ABS-ECU 100 determines in step S14 that the clutch is in a connected state (step S14: YES), the ABS-ECU 100 determines whether or not the transmission is in a power transmitting state (step S15). When the ABS-ECU 100 determines in step S14 that the clutch is not in a connected state (step S14: NO), the ABS-ECU 100 repeats the series of processing steps from step S11.

When the ABS-ECU 100 determines that the transmission is in a power transmitting state (step S15: YES), the ABS-ECU 100 determines whether or not the engine speed is equal to or greater than a predetermined speed (step S16). Here, it suffices for the predetermined speed used in the determination to be distinguishable from a speed region used mainly in a state of travel such as in-town riding. By performing the processing of step S16, in-town riding can be distinguished from circuit travel or the like. When the ABS-ECU 100 determines in step S15 that the transmission is not in a power transmitting state (step S15: NO), the ABS-ECU 100 repeats the series of processing steps from step S11.

When the ABS-ECU 100 determines in step S16 that the engine speed is equal to or greater than the predetermined speed (step S16: YES), the ABS-ECU 100 determines whether or not the engine speed is on a rising trend (step S17). Here, when the engine speed is on a riding trend, this means a rise in the engine speed accompanying an increase in the reduction ratio of the transmission due to a downshift. When the ABS-ECU 100 determines in step S16 that the engine speed is not equal to or greater than the predetermined speed (step S16: NO), the ABS-ECU 100 repeats the series of processing steps from step S11.

When the ABS-ECU 100 determines in step S17 that the engine speed is on a rising trend (step S17: YES), the ABS-ECU 100 changes the threshold value for determining whether or not to perform antilock brake control to the offset threshold value at the time of a downshift (step S18). The state in which the threshold value has been changed to the offset threshold value is maintained while the engine speed is equal to or greater than the predetermined speed and rising. When the ABS-ECU 100 determines in step S17 that the engine speed is not on a rising trend (step S17: NO), the ABS-ECU 100 repeats the series of processing steps from step S11.

Because of the above-described processing, the ABS-ECU 100 can determine through step S11 to step S17 that the action of engine braking after a downshift is large and change the threshold value for determining whether or not to perform antilock brake control to the offset threshold value at the time of a downshift. At a time when the ABS-ECU 100 has determined, at substantially the same time, a sudden accelerator pedal OFF operation and a downshift, the ABS-ECU 100 selects the larger of the offset threshold values.

In the present embodiment, the ABS-ECU 100 detects a sudden throttle OFF operation and a downshift and changes the threshold value for determining whether or not to perform antilock brake control to the offset threshold value. Because of this, unnecessary antilock brake control intervention that is unwanted by the driver can be prevented from intervening, so the brake device can be caused to perform braking as envisioned by the driver even in a situation where a large braking force resulting from engine braking is acting.

Further, in the present embodiment, the ABS-ECU 100 varies the offset threshold value in such a way that the offset threshold value decreases gently when the ABS-ECU 100 returns the threshold value from the offset threshold value to the original threshold value that is not offset. Because of this, antilock brake control can be prevented from intervening suddenly together with the end of the offset, so it can be made harder for a sense of incongruity resulting from the threshold value of antilock brake control having been offset to be imparted to the driver.

The present invention has been described above on the basis of an embodiment, but the present invention is limited thereto. For example, in the above-described embodiment, the ABS-ECU 100 is installed on a motorcycle, but the ABS-ECU 100 is not limited thereto.

Further, in the above-described embodiment, the ABS-ECU 100 acquires the engine speed signal, the accelerator pedal position signal, the clutch ON/OFF signal, and the gear position signal from the engine ECU 10 via the connecting line 20, but the present invention is not limited thereto. For example, the ABS-ECU 100 may also acquire the engine speed signal, the accelerator pedal position signal, the clutch ON/OFF signal, and the gear position signal directly from the engine speed sensor, the accelerator pedal position sensor, the clutch switch, and the gear position sensor.

Moreover, in the above-described embodiment, the ABS-ECU 100 is connected to the engine ECU 10 via the connecting line 20, but the present invention is not limited thereto. For example, the ABS-ECU 100 may also be connected to the engine ECU, the engine speed sensor, the accelerator pedal position sensor, the clutch switch, and the gear position sensor by a wireless connection.

Moreover, in the above-described embodiment, a change in reduction ratio resulting from switching the gears of a stepped transmission has been described as a downshift, but the present invention is not limited thereto. For example, the downshift may also be a downshift resulting from a change in reduction ratio resulting from a continuously variable transmission, and the present invention is also suitable particularly in the case of changing reduction ratios abruptly.

REFERENCE SIGNS LIST

1 Front Wheel Pressure Decreasing Valve
2 Rear Wheel Pressure Decreasing Valve
3 Front Wheel Holding Valve
4 Rear Wheel Holding Valve
5 Pump Motor
6 Front Wheel Speed Sensor
7 Rear Wheel Speed Sensor
10 Engine ECU (Engine Control Unit)
11 Engine Speed Sensor 12 Accelerator Pedal Position Sensor
13 Clutch Switch
14 Gear Position Sensor
20 Connecting Line
100 ABS-ECU (Vehicle Braking Force Control Device)

The invention claimed is:

1. A vehicle braking force control device that performs antilock brake control when the slip ratio of a wheel has become equal to or greater than a predetermined threshold, wherein
the vehicle braking force control device acquires a signal corresponding to the state of an engine, a clutch, or a transmission, and
at a time when the vehicle braking force control device has determined that an action of engine braking satisfies a predetermined condition on the basis of the signal, the vehicle braking force control device changes the predetermined threshold value to an offset threshold value that is greater than the predetermined threshold, and performs antilock brake control when the slip ratio of a wheel has become equal to or greater than the offset threshold value.

2. The vehicle braking force control device according to claim 1, wherein the
signal includes an accelerator pedal position signal corresponding to an accelerator pedal position of the engine, a clutch connection signal corresponding to a state of connection of the clutch, and a power transmission signal corresponding to a state of power transmission of the transmission, and
the vehicle braking force control device determines whether or not the action of engine braking satisfies the predetermined condition on the basis of the accelerator pedal position signal, the clutch connection signal, and the power transmission signal.

3. The vehicle braking force control device according to claim 2, wherein the vehicle braking force control device determines that the action of engine braking satisfies the predetermined condition when the accelerator pedal position decreases equal to or greater than a predetermined pedal position within a predetermined amount of time, the clutch is in a connected state, and the transmission is in a power transmitting state.

4. The vehicle braking force control device according to claim 3, wherein the vehicle braking force control device determines that the accelerator pedal position has decreased equal to or greater than a predetermined pedal position within a predetermined amount of time in a case where the accelerator pedal position has reached a substantially completely closed state from a state equal to or greater than a predetermined value.

5. The vehicle braking force control device according to claim 2, wherein
the vehicle braking force control device further acquires an engine speed signal corresponding to an engine speed, and
the vehicle braking force control device determines that the action of engine braking satisfies the predetermined condition when the transmission is downshifted, the accelerator pedal position is in a substantially completely closed state, the clutch is in a connected state, the transmission is in a power transmitting state, and the engine speed is equal to or greater than a predetermined speed and rising.

6. The vehicle braking force control device according to claim 5, wherein the change to the offset threshold value is maintained while the engine speed is equal to or greater than a predetermined speed and rising.

7. The vehicle braking force control device according to claim 5, wherein the offset threshold value at the time accompanied by the downshift makes antilock brake control less likely to occur than the offset threshold value at the time unaccompanied by the downshift.

8. The vehicle braking force control device according to claim 5, wherein the amount of time in which the vehicle braking force control device maintains the predetermined threshold value at the offset threshold value is longer in the case of the offset threshold value at the time accompanied by the downshift than in the case of the offset threshold value at the time unaccompanied by the downshift.

9. The vehicle braking force control device according to claim 5, wherein when engine braking at the time when the transmission has been downshifted and engine braking at the time when the accelerator pedal position has decreased equal to or greater than a predetermined pedal position within a predetermined amount of time have been determined at substantially the same time, the vehicle braking force control device changes the predetermined threshold value to the offset threshold value at the time when the transmission has been downshifted.

10. The vehicle braking force control device according to claim 1, wherein when the vehicle braking force control device returns the offset threshold value to the original predetermined threshold value, the vehicle braking force control device decreases the offset amount of the offset threshold value.

11. The vehicle braking force control device according to claim 1, wherein
the vehicle braking force control device is connected to an engine control unit that controls the engine, and
the vehicle braking force control device acquires the signal corresponding to the state the engine, the clutch, or the transmission from the engine control unit.

12. The vehicle braking force control device according to claim 1, wherein the change to the offset threshold value is maintained for a predetermined amount of time.

* * * * *